(12) United States Patent
Roth-Fagaraseanu et al.

(10) Patent No.: US 7,479,328 B2
(45) Date of Patent: Jan. 20, 2009

(54) SHROUD SEGMENT FOR A TURBOMACHINE

(75) Inventors: Dan Roth-Fagaraseanu, Berlin (DE); Thomas Wunderlich, Rangsdorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 10/897,423

(22) Filed: Jul. 23, 2004

(65) Prior Publication Data

US 2005/0276688 A1 Dec. 15, 2005

(30) Foreign Application Priority Data

Jul. 25, 2003 (DE) ................. 103 34 698

(51) Int. Cl.
*B32B 18/00* (2006.01)
*B32B 15/04* (2006.01)

(52) U.S. Cl. ................. 428/632; 428/312.2; 428/698; 428/701; 428/702; 415/173.4

(58) Field of Classification Search ............ 416/241 B, 416/241 R; 428/312.2, 632, 698, 701, 702; 415/173.4
See application file for complete search history.

(56) References Cited

U.S. PATENT DOCUMENTS

| | | | | |
|---|---|---|---|---|
| 3,825,364 A | * | 7/1974 | Halila et al. | 415/116 |
| 4,017,207 A | * | 4/1977 | Bell et al. | 415/115 |
| 4,273,824 A | * | 6/1981 | McComas et al. | 442/7 |
| 4,422,648 A | * | 12/1983 | Eaton et al. | 277/415 |
| 4,588,607 A | * | 5/1986 | Matarese et al. | 427/452 |
| 4,650,395 A | * | 3/1987 | Weidner | 415/116 |
| 4,732,534 A | * | 3/1988 | Hanser | 415/136 |
| 4,867,639 A | * | 9/1989 | Strangman | 415/173.4 |
| 5,196,471 A | | 3/1993 | Rangaswamy | |
| 5,434,210 A | * | 7/1995 | Rangaswamy et al. | 524/406 |
| 5,530,050 A | | 6/1996 | Rangaswamy | |
| 5,705,231 A | | 1/1998 | Nissley | |
| 5,866,271 A | * | 2/1999 | Stueber et al. | 428/545 |
| 5,997,248 A | | 12/1999 | Ghasripoor | |
| 6,102,656 A | | 8/2000 | Nissley | |
| 6,358,002 B1 | | 3/2002 | Good | |
| 6,435,824 B1 | * | 8/2002 | Schell et al. | 415/174.4 |
| 6,440,575 B1 | * | 8/2002 | Heimberg et al. | 428/472 |
| 6,652,227 B2 | * | 11/2003 | Fried | 415/173.4 |
| 6,705,231 B1 | * | 3/2004 | Zacharin | 102/231 |
| 6,758,653 B2 | * | 7/2004 | Morrison | 415/173.4 |

(Continued)

FOREIGN PATENT DOCUMENTS

DE 3321477 C2 12/1983

(Continued)

*Primary Examiner*—John J. Zimmerman
*Assistant Examiner*—Aaron Austin
(74) *Attorney, Agent, or Firm*—Timothy J. Klima

(57) ABSTRACT

On an aircraft engine with a shroudless rotor wheel arranged in a flow duct, the flow duct includes a shroud segment (1) formed by a ceramic rubbing coating (3) which, while having good thermal conductivity, is highly-temperature resistant, attaches firmly to the metallic substrate (2) and is abradable by the tips of the rotor wheel to form a sealing gap as narrow as possible, this rubbing coating, owing to the lack of self-insulation, being coolable from a free side of the metallic substrate and, therefore, permitting for working gas temperatures occurring in high-pressure turbines and coating thicknesses sufficient for abrasion.

24 Claims, 4 Drawing Sheets

U.S. PATENT DOCUMENTS 6,764,771 B1   7/2004   Heimberg

FOREIGN PATENT DOCUMENTS

| | | |
|---|---|---|
| EP | 0487273 | 5/1992 |
| EP | 0965730 | 12/1999 |
| EP | 0965730 A2 | 12/1999 |
| WO | 99/23278 | 5/1999 |

* cited by examiner

SHROUD SEGMENT FOR A TURBOMACHINE

This application claims priority to German Patent Application DE10334698.8, filed Jul. 25, 2004, the entirety of which is incorporated by reference herein.

BACKGROUND OF THE INVENTION

This invention relates to a shroud segment for a turbomachine, in particular an aircraft engine, with a flow duct and a bladed rotor wheel arranged in the flow duct which perform a relative rotary movement and are flown by a hot working gas, with the shroud segment comprising a metallic substrate provided by the flow duct and a ceramic rubbing coating which is bonded to the inner surface of the substrate and is abradable by the blade tips for the formation of a narrow sealing gap.

On turbomachinery, for example aircraft engines or stationary gas turbines, the sealing gap between the tips of the rotor blades fitted to a rotor and the inner surface of a casing surrounding these rotor blades must be minimized to achieve high efficiency. As is known, the required minimum sealing gap width is achieved in that the ceramic coating with low thermal conductivity applied to the inner surface of the metallic casing for the purpose of thermal insulation of the latter equally acts as weraway or attrition coating, hereinafter referred to as rubbing coating. In order to achieve the required weraway or rub, a burning-out material, for example a polymer powder, is, in a known version, admixed to the ceramic material, this powder providing for the porosity of the rubbing coating and, thus, for the release of free particles from its surface as the blade tips move relatively to the casing. In the case of stationary blades, the ceramic rubbing coating can also be applied to a rotary engine component. Other than the above mentioned shroudless rotary blade tips and their mating stationary ceramic-coated shroud segments, stationary blades can, at their tips, be equipped with shrouds with—abradable—ceramic rubbing coating.

Such a rubbing coating, i.e. a segmented, abradable ceramic coating applied to the metallic substrate of a flow duct segment, is described in detail in Specifications U.S. Pat. Nos. 6,102,656 and 5,705,231. It comprises an underlayer of zirconium oxide stabilized with ceroxide, magnesium oxide, yttrium oxide or calcium oxide to which, in this sequence, an intermediate layer and an abradable top layer for the formation of the sealing gap is applied, these layers again including a heat-insulating ceramic zirconium oxide as a base material.

For automatic formation of the gaps, reduction of the surface temperature of the components facing the blade tips and the protection of these components against overheating, highly heat-insulating, but abradable coatings on the basis of zirconium oxide are equally used in various other publications, for example U.S. Pat. Nos. 5,530,050, 5,866,271 or 5,997,248, with this material having a very low coefficient of thermal conductivity, forming a thick-walled layer and being composed or structured in at least the area facing the blade tips such that, together with the blade tips, a rubbing surface for the formation of a minimum sealing gap between the stationary and the rotary components is created.

Zirconium-based rubbing coatings are, however, disadvantageous because of their tendency towards sintering and phase transformation in a temperature range above 1200° C., as a result of which the ceramic material embrittles and its adhesion on the metallic substrate is impaired. Even if the gas turbine with zirconium-based rubbing coating operated in this elevated temperature range is cooled by means of a cooling medium passed along the rear side of the metallic substrate, embrittlement and separation of the heat-insulating abradable ceramic material applied with a specified, sufficiently large coating thickness cannot be mitigated even with high cooling flow rates—as demonstrated by tests.

BRIEF SUMMARY OF THE INVENTION

It is a broad aspect of the present invention to design the area of a turbomachine provided with an abradable ceramic rubbing coating in which the blade tips of a rotor wheel and the inner surface of a flow duct face each other and rotate relatively to each other such that the function of the rubbing coating, namely to form and maintain a narrow sealing gap between the blade tips and the flow duct wall, is ensured even at high temperatures of the working gas.

It is a particular object of the present invention to provide solution to the above problems by a rubbing coating designed in accordance with the features described herein, this rubbing coating being cooled from the rear side of the metallic substrate, to which it is bonded. Further features and advantageous embodiments of the present invention will become apparent from the description below.

It was found that the conventional ceramic rubbing coatings based on zirconium oxide possess, on the one hand, an extremely low coefficient of thermal conductivity and, thus, good thermal insulation characteristics. On the other hand, with very high gas temperatures and/or large coating thicknesses and the resultant need for cooling due to the self-insulating effect of the zirconium oxide and in connection with the coating thickness actually required for abrasion of the rubbing coating, such coatings cannot be cooled, or cannot be cooled as necessary for the correspondingly high working gas temperatures, even if high cooling medium flow rates are used. Contrary to what has been expert opinion, the rubbing coating according to the present invention, which, in the known manner, is applied with a specified, abrasion-permitting material thickness, comprises a high-temperature resistant, but thermally conductive ceramic material to which a cooling medium is applied via the inner side of the metallic substrate bonded to the ceramic material. The coefficient of thermal conductivity of the ceramic material, at an operating temperature >1200° C., is higher than 2.0 W/mK, with a coating thicknesses of more than 0.4 mm being permitted.

The solution according to the present invention allows the corresponding components, for example in the high-pressure turbine stage of an aircraft engine, to be operated at very high working gas temperatures with enhanced efficiency, with the function of the abradable rubbing coating in terms of material resistance and coating thickness required for the formation of a narrow sealing gap between the blade tips and the adjacent inner surface of the flow duct being ensured in this high temperature range.

In a further development of the present invention, spinels, preferably magnesium spinels, are used as ceramic materials for the rubbing coating. In order to ensure the wearaway or abrasion of the ceramic spinel, the rubbing coating in accordance with the present invention comprises a compact ceramic layer bonded to the metallic component and a porous ceramic layer applied on the side of the hot gas. Porosity is preferably achieved by the addition of hexagonal boron nitride (hBN) and/or organic matter, such as polyester.

Bonding of the rubbing coating to the metallic substrate is preferably achieved by a spatially arranged bond coat, which is either an integral part of the metallic substrate or an additional overlay, for example in the form of a wire mesh, and is suitably bonded to the substrate, i.e. the metallic support, by a thermal joining process, for example. A further example is the bonding of coarse power particles in a high-temperature alloy to the surface by joining processes. In both cases, 3D structures are created, characterized by an improved interlock of the ceramic layer with the substrate.

The present invention preferably applies to aircraft engines whose rotor wheels possess blades with shroudless tips, with the shroudless blade tips facing, in the flow duct, a stationary shroud segment provided with a rubbing coating. The present invention is, however, generally applicable to components of turbomachines, in particular those operated at high temperatures, where a rotary and a stationary component move relatively to each other, with a ceramic rubbing coating being applied to one component which is abradable by the other component to form a gap as narrow as possible between both components.

BRIEF DESCRIPTION OF THE DRAWINGS

The present invention is more fully described in the light of the accompanying drawings.

DETAILED DESCRIPTION OF THE INVENTION

Figure 1:
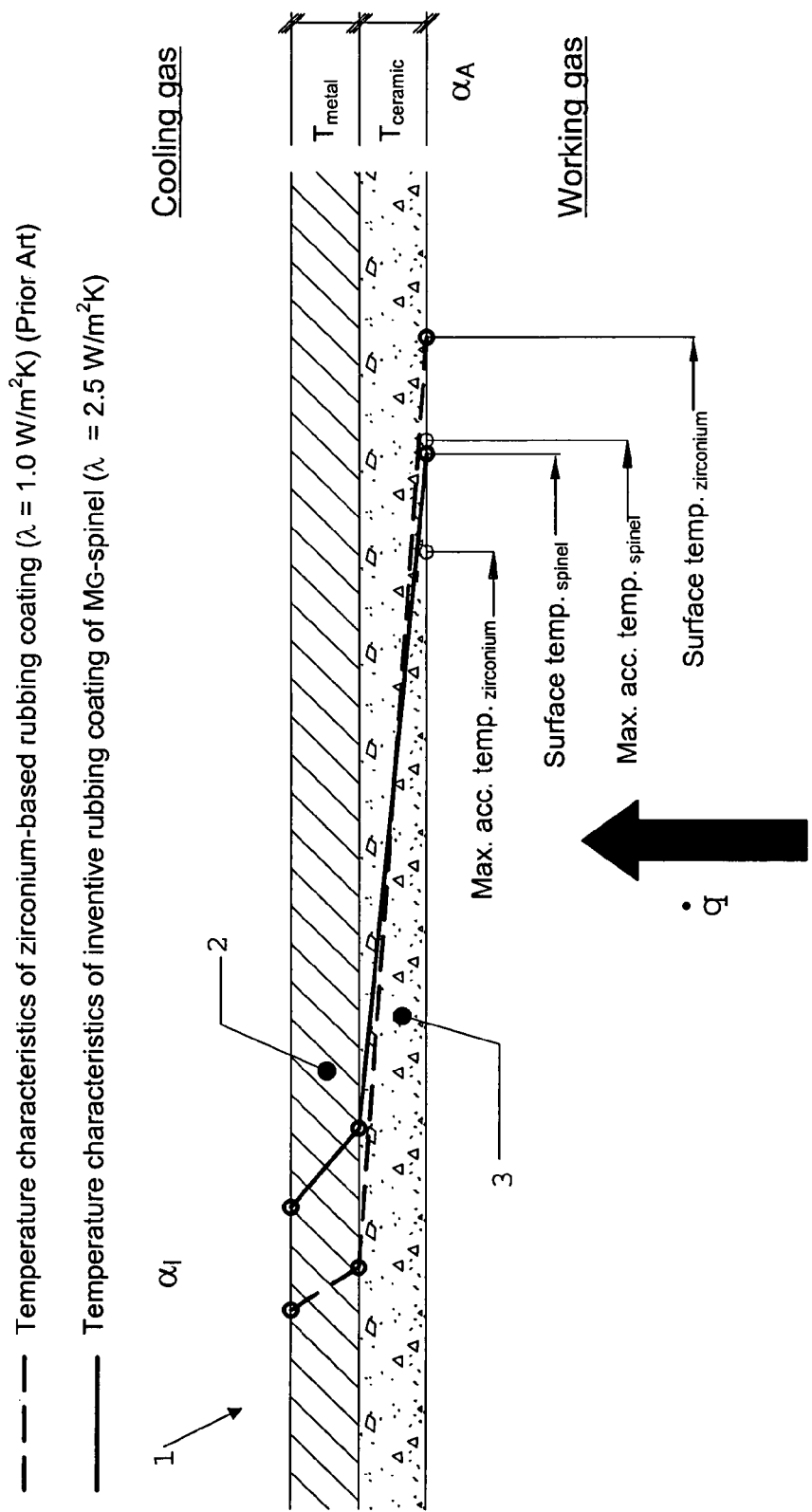
FIG. 1 shows, in sectional view, a stationary, cooled shroud segment with the temperature characteristics of a rubbing coating designed in accordance with the state of the art and in accordance with the present invention, respectively.

This detailed description should be read in combination with the summary above. As shown in FIG. 1, the stationary shroud segment 1 comprises a metallic support 2 (substrate) to which a rubbing coating 3 of a high-temperature resistant ceramic material firmly adheres. The turbine blade tips mating with the rubbing coating 3 with a small clearance are not shown on the drawing. Working gas, which is fed via a stator vane from the combustion chamber (not illustrated) of an aircraft engine flows with a certain temperature ($Temp_{working\ gas}$), which, for example, can be 1500° C., along the rubbing coating 3, while a cooling gas with a temperature ($Temp_{cooling\ gas}$) flows at the rear side of the metallic support 2 of the shroud segment 1. The specific heat flux in the direction of the bold arrow is:

$$\dot{q} = k(Temp_{working\ gas} - Temp_{cooling\ gas}),$$

with k being the coefficient of heat transmission resulting from the coefficients of heat transfer on the working gas side or on the cooling gas side $\alpha I$ and $\alpha A$, respectively, the thickness of the metallic substrate or of the rubbing coating $T_{metal}$ and $T_{ceramic}$, respectively, and the corresponding coefficients of thermal conductivity $\lambda_{metal}$ and $\lambda_{ceramic}$.

FIG. 1 illustrates the rubbing coating 3 both on the basis of zirconium with an extremely low coefficient of thermal conductivity of $\lambda=1.0$ W/mK at working temperature in accordance with the state of the art and on the basis of magnesium spinel with a high coefficient of thermal conductivity of $\lambda \geq 2.0$ W/mK in accordance with the present invention, including $\lambda=$ or $\approx 2.5$ W/mK. With the boundary conditions for cooling gas temperature and working gas temperature as well as wall thickness and coating thickness being otherwise the same, the dashed line initially shows the temperature characteristics in the shroud segment 1 for a conventional rubbing coating based on zirconium. As is apparent, the surface temperature (Surface temp.$_{zirconium}$) of the zirconium-based rubbing coating according to the state of the art is far beyond the maximum acceptable temperature (Max.acc.temp.$_{zirconium}$), which is due to the fact that the self-insulation property of zirconium oxide renders the cooling efficiency of the cooling gas inadequate. The rubbing coating embrittles, is likely to separate from the metallic substrate and will, finally, not satisfy the requirement for the formation of a gap as narrow as possible, with the resulting negative consequences on efficiency.

However, the temperature characteristics of an inventive rubbing coating with high coefficient of thermal conductivity, which is shown by the continuous line, clearly reveals that the surface temperature of the rubbing coating in magnesium spinel (Surface temp.$_{spinel}$) is still below the maximum acceptable temperature for a spinel-based rubbing coating (Max.acc.temp$_{spinel}$) and far below the surface temperature of the zirconium-based rubbing coating (Surface temp.$_{zirconium}$). Therefore, even at high working gas temperatures and relatively low cooling gas mass flow, the ceramic rubbing coating in accordance with the present invention with relatively high thermal conductivity will not be deteriorated and will remain fully functional.

In a further embodiment of the present invention, spinels, preferably magnesium spinels, are used as ceramic materials for the rubbing coating. In order to ensure the wear away or abrasion of the ceramic spinel, the rubbing coating 3 in accordance with the present invention can comprise a compact ceramic layer bonded to the metallic component 2 and a porous ceramic layer applied on the side of the hot gas. Porosity is preferably achieved by the addition of hexagonal boron nitride (hBN) and/or organic matter, such as polyester.

Bonding of the ceramic coating to the metallic substrate is preferably achieved by a spatially arranged structure, which is either an integral part of the metallic substrate or an additional overlay, for example in the form of a wire mesh or welded arrangement, and is suitably bonded to the substrate, i.e. the metallic support, by a thermal joining process, for example. In both cases, 3D structures are created, characterized by an improved interlock of the ceramic layer with the substrate.

Figure 2:
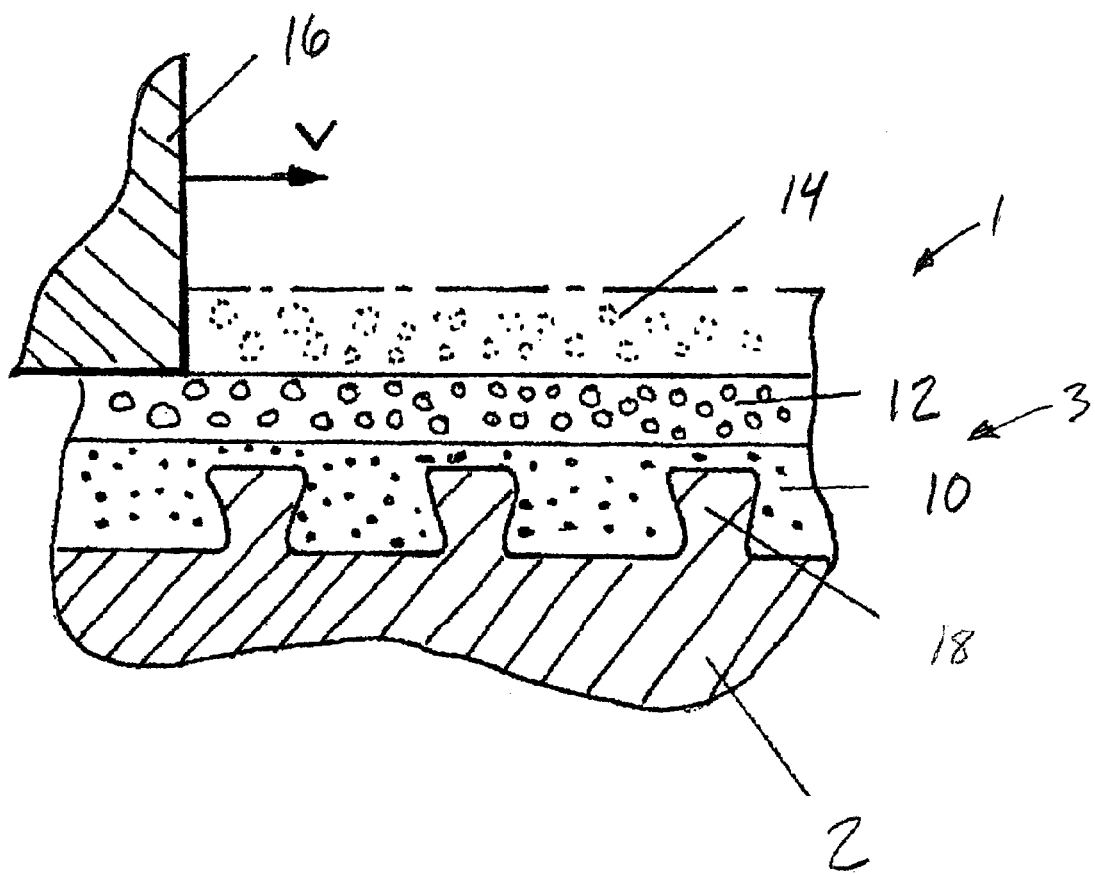
FIG. 2 shows a partial sectional view of a shroud segment showing one embodiment of a metallic substrate to ceramic layer bond.

FIG. 2 shows a partial sectional view of a shroud segment 1 showing one embodiment of a metallic substrate 2 to ceramic layer 3 bond. The metallic substrate 2 includes a three dimensional interlocking interface which includes posts 18. The posts can be integrally cast or machined, for example, laser dado. They can be of different configurations, including a dovetail configuration. These posts 18 interlock with the ceramic layer 3, which here is shown as comprising multiple layers, including a dense (compact) ceramic layer 10, a porous ceramic layer 12 and an abraded ceramic layer 14, with the posts interlocking with one or more of the ceramic layers. Blade 16 is shown, which abrades away the ceramic layer 3. The ceramic layer 3 can also be in a single layer, omit certain of the layer(s) shown and/or include other layer(s).

Figure 3:
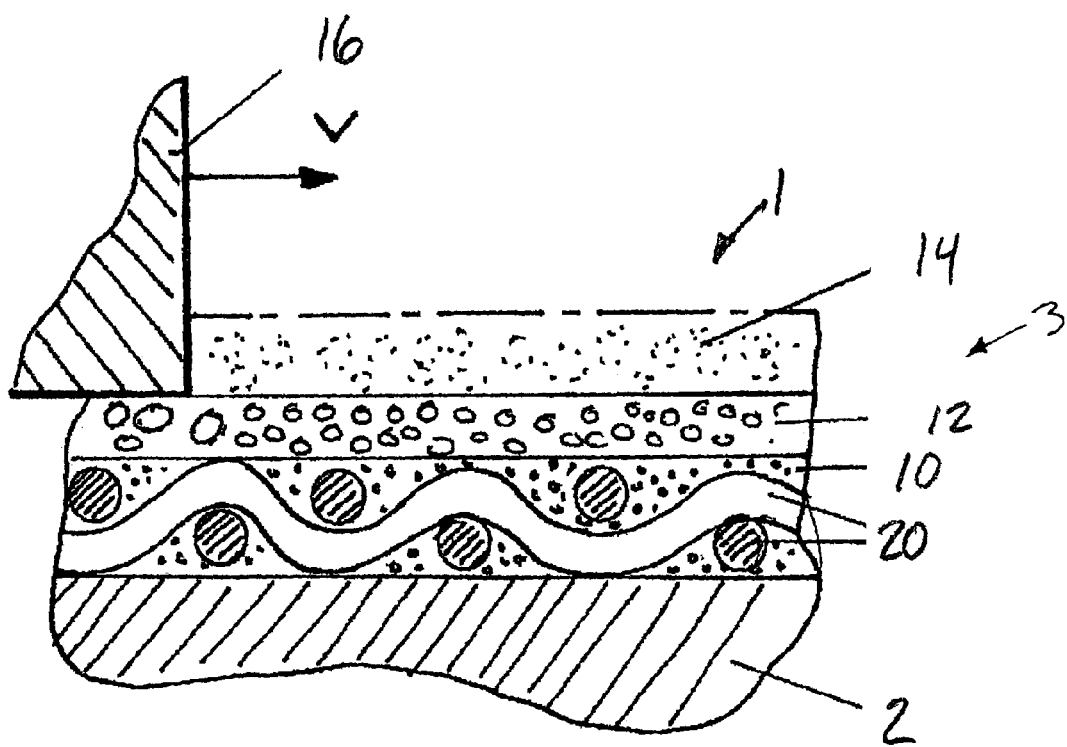
FIG. 3 shows a partial sectional view of a shroud segment showing an alternative embodiment of a metallic substrate to ceramic layer bond.

FIG. 3 shows a partial sectional view of a shroud segment 1 showing an alternative embodiment of a metallic substrate 2 to ceramic layer 3 bond. A wire mesh type interface 20 is attached to the metallic substrate 2, for instance by brazing or welding, to provide a three dimensional interlocking interface with the ceramic layer 3.

Figure 4:
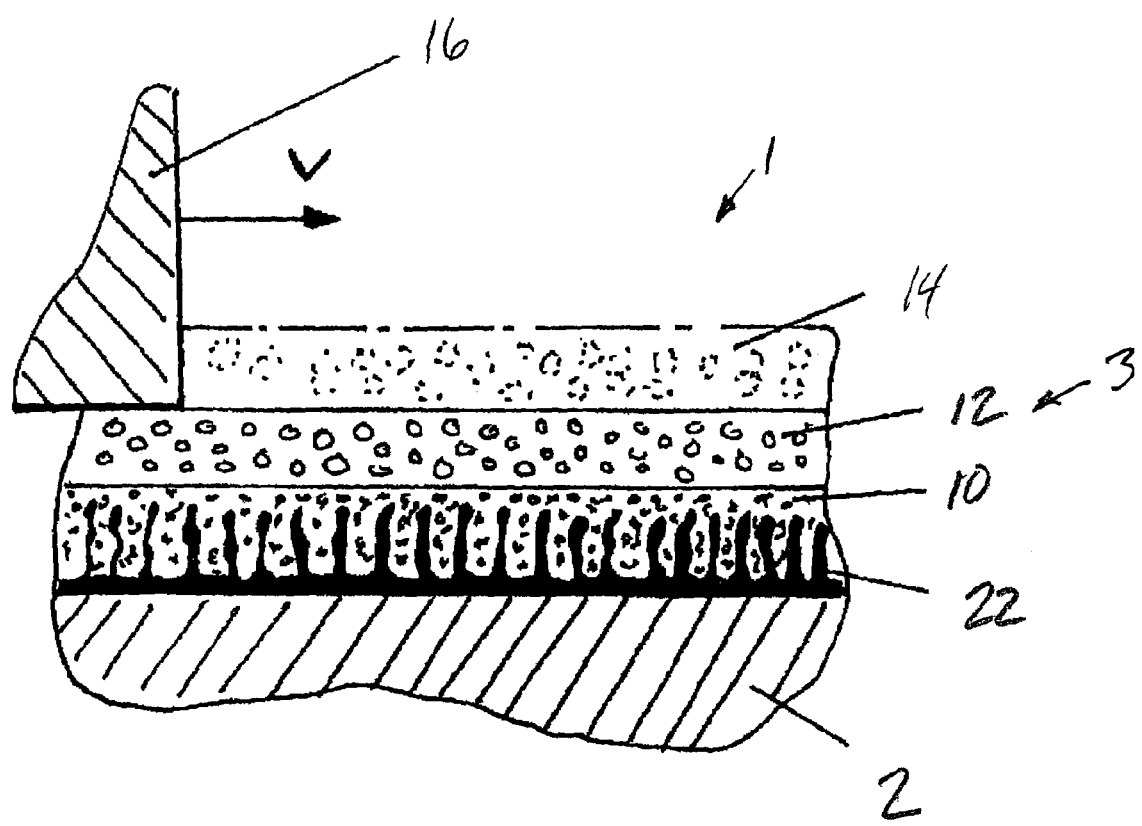
FIG. 4 shows a partial sectional view of a shroud segment showing an alternative embodiment of a metallic substrate to ceramic layer bond.

FIG. 4 shows a partial sectional view of a shroud segment 1 showing an alternative embodiment of a metallic substrate 2 to ceramic layer 3 bond. Here, a felt metal type of interface 22 is attached to the metallic substrate 2, for instance by brazing or welding, to provide a three dimensional interlocking interface with the ceramic layer 3.

Various aspects of the various embodiments disclosed can be combined in various manners to create different embodiments.

What is claimed is:

1. A shroud segment for a turbomachine, the turbomachine having a flow duct, and a bladed rotor wheel arranged in the flow duct, which flow duct and bladed rotor wheel perform a relative rotary movement and which are flown by a hot working gas, the shroud segment comprising:
    a metallic substrate having an outer surface exposed to a cooling gas flow external of the flow duct of the turbomachine; and
    a ceramic rubbing coating having an inner surface and an outer surface, the ceramic rubbing coating outer surface bonded directly to at least one of an inner surface of the metallic substrate and a metallic bond layer attached directly to the metallic substrate, the ceramic rubbing coating inner surface being abradable by blade tips of the bladed rotor wheel for the formation of a narrow sealing gap, wherein the rubbing coating comprises a high-temperature resistant, thermally conductive ceramic material which is cooled through the metallic substrate by the exposure of the outer surface of the metallic substrate to the cooling gas flow, wherein the ceramic material is a spinel and the coefficient of thermal conductivity of the rubbing coating is $\geq 2.0$ W/mK at an operating temperature; the thickness of the rubbing coating being more than 0.4 mm.

2. A shroud segment in accordance with claim 1, wherein the coefficient of thermal conductivity of the rubbing coating is approximately 2.5 W/mK at the operating temperature.

3. A shroud segment in accordance with claim 1, wherein the ceramic material of the rubbing coating is a Mg spinel.

4. A shroud segment in accordance with claim 3, wherein the rubbing coating comprises a compact first layer of ceramic material and, on an abraded side, a porous second layer of ceramic material.

5. A shroud segment, in accordance with claim 4, wherein the porous second layer of ceramic material includes at least one of hexagonal boron nitride and organic material.

6. A shroud segment in accordance with claim 5, wherein the organic material is polyester.

7. A shroud segment in accordance with claim 4, wherein the rubbing coating is connected to the metallic substrate via a spatial bonding element.

8. A shroud segment in accordance with claim 7, wherein the spatial bonding element is an integral part of the metallic substrate.

9. A shroud segment in accordance with claim 7, wherein the spatial bonding element is thermally bonded to the metallic substrate.

10. A shroud segment in accordance with claim 7, wherein the bonding element comprises a layer of bonded powder particles of a high-temperature alloy.

11. A shroud segment in accordance with claim 7, wherein the bonding element comprises a layer of posts attached to the metallic substrate.

12. A shroud segment in accordance with claim 7, wherein the bonding element comprises a wire mesh layer attached to the metallic substrate.

13. A shroud segment in accordance with claim 7, wherein the bonding element comprises a felt metal layer attached to the metallic substrate.

14. A shroud segment in accordance with claim 1, wherein the rubbing coating comprises a compact first layer of ceramic material and, on an abraded side, a porous second layer of ceramic material.

15. A shroud segment in accordance with claim 14, wherein the porous second layer of ceramic material includes at least one of hexagonal boron nitride and organic material.

16. A shroud segment in accordance with claim 15, wherein the organic material is polyester.

17. A shroud segment in accordance with claim 1, wherein the rubbing coating is connected to the metallic substrate via a spatial bonding element.

18. A shroud segment in accordance with claim 17, wherein the spatial bonding element is an integral part of the metallic substrate.

19. A shroud segment in accordance with claim 17, wherein the spatial banding element is thermally bonded to the metallic substrate.

20. A shroud segment in accordance with claim 19, wherein the bonding element comprises a layer of bonded powder particles of a high-temperature alloy.

21. A shroud segment in accordance with claim 17, wherein the bonding element comprises a layer of posts attached to the metallic substrate.

22. A shroud segment in accordance with claim 17, wherein the bonding element comprises a wire mesh layer attached to the metallic substrate.

23. A shroud segment in accordance with claim 17, wherein the bonding element comprises a felt metal layer attached to the metallic substrate.

24. A shroud segment for a hot gas flow duct of a turbomachine, comprising:
    a metallic substrate having an outer surface exposed to a cooling gas flow external of the hot gas flow duct of the turbomachine, and
    a ceramic rubbing coating having an inner surface and an outer surface, the ceramic rubbing coating outer surface bonded directly to at least one of an inner surface of the metallic substrate and a metallic bond layer attached directly to the metallic substrate, the ceramic rubbing coating inner surface being abradable by blade tips of a bladed rotor wheel of the turbomachine for the formation of a narrow sealing gap,
    the rubbing coating comprising a high-temperature resistant, thermally conductive ceramic material which is cooled through the metallic substrate by the exposure of the outer surface of the metallic substrate to the cooling gas flow, wherein the ceramic material is a spinel and the coefficient of thermal conductivity of the rubbing coating is $\geq 2.0$ W/mK at an operating temperature; the thickness of die rubbing coating being more than 0.4 mm.

* * * * *